United States Patent
Takada (10) Patent No.: US 11,292,507 B2
(45) Date of Patent: Apr. 5, 2022

(54) MOTOR AND ELECTRIC POWER STEERING DEVICE

(71) Applicant: Nidec Corporation, Kyoto (JP)

(72) Inventor: Tomoyuki Takada, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 129 days.

(21) Appl. No.: 16/468,687

(22) PCT Filed: Dec. 22, 2017

(86) PCT No.: PCT/JP2017/046166
§ 371 (c)(1),
(2) Date: Jun. 12, 2019

(87) PCT Pub. No.: WO2018/123879
PCT Pub. Date: Jul. 5, 2018

(65) Prior Publication Data
US 2020/0079420 A1 Mar. 12, 2020

(30) Foreign Application Priority Data
Dec. 28, 2016 (JP) .............................. JP2016-254993

(51) Int. Cl.
*B62D 5/04* (2006.01)
*H02K 11/215* (2016.01)
(Continued)

(52) U.S. Cl.
CPC ........... *B62D 5/0403* (2013.01); *B62D 5/064* (2013.01); *H02K 5/1732* (2013.01); *H02K 9/22* (2013.01); *H02K 11/215* (2016.01); *H02K 11/33* (2016.01)

(58) Field of Classification Search
CPC .... B62D 5/0403; B62D 5/064; B62D 5/0406; H02K 11/215; H02K 11/33; H02K 5/1732;
(Continued)

(56) References Cited

U.S. PATENT DOCUMENTS

| 9,999,159 B2 | 6/2018 | Yamanaka et al. |
| 2010/0124024 A1* | 5/2010 | Nishiuma .......... H05K 7/20509 361/705 |

(Continued)

FOREIGN PATENT DOCUMENTS

| JP | 2014-75866 A | 4/2014 |
| JP | 2014-82824 A | 5/2014 |

(Continued)

OTHER PUBLICATIONS

See attached translated version of Takashi foreign patent JP 2015089151. (Year: 2015).*

(Continued)

*Primary Examiner* — Shawki S Ismail
*Assistant Examiner* — Htet Z Kyaw
(74) *Attorney, Agent, or Firm* — Keating & Bennett (57) ABSTRACT

A motor includes a shaft to rotate about a central axis extending in a vertical direction, a metal heat sink including a through-hole through which the shaft extends, a substrate disposed at an upper side of the heat sink through a gap, a sensor magnet fixed to an upper end of the shaft, a rotation sensor located at an upper side of the sensor magnet, and a heat dissipating material located in a gap between the substrate and the heat sink. The heat sink includes a heat sink main body portion and a wall portion located between the substrate and the heat sink main body portion and between the heat dissipating material and the through-hole when viewed from the vertical direction.

11 Claims, 6 Drawing Sheets

(51) Int. Cl.
   *H02K 11/33* (2016.01)
   *B62D 5/06* (2006.01)
   *H02K 5/173* (2006.01)
   *H02K 9/22* (2006.01)
(58) Field of Classification Search
   CPC .......... H02K 9/22; H02K 7/14; H02K 1/2733; H02K 11/21; H02K 11/20; H02K 11/30; H02K 11/24–27
   USPC .......................................................... 310/64
   See application file for complete search history.

(56) References Cited

U.S. PATENT DOCUMENTS

| | | | | |
|---|---|---|---|---|
| 2014/0225482 | A1* | 8/2014 | Hara | H02K 9/22 310/68 D |
| 2015/0319839 | A1* | 11/2015 | Ichikawa | F04C 18/0215 310/64 |
| 2016/0036299 | A1* | 2/2016 | Hayashi | H02K 1/16 310/64 |
| 2016/0036304 | A1* | 2/2016 | Yamasaki | H02K 5/225 180/446 |
| 2016/0037659 | A1 | 2/2016 | Yamanaka | |
| 2016/0037674 | A1 | 2/2016 | Yamanaka et al. | |
| 2016/0192535 | A1* | 6/2016 | Yamanaka | H02K 11/33 310/52 |
| 2016/0218583 | A1* | 7/2016 | Hayashi | H02K 5/10 |
| 2016/0218597 | A1* | 7/2016 | Hayashi | H02K 5/15 |
| 2016/0218598 | A1* | 7/2016 | Hayashi | H02K 5/225 |
| 2019/0313549 | A1* | 10/2019 | Fujita | H02K 11/33 |

FOREIGN PATENT DOCUMENTS

| | | |
|---|---|---|
| JP | 2015-89151 A | 5/2015 |
| WO | 2016/113929 A1 | 7/2016 |

OTHER PUBLICATIONS

See attached translated version of Kazuma et al. foreign patent JP 2014082824. (Year: 2014).*

Received STIC search report from EIC 2800 searcher Jyothsna Kondamudi for claim 12 on Jun. 11, 2021. (Year: 2021).*

Official Communication issued in International Patent Application No. PCT/JP2017/046166, dated Mar. 20, 2018.

* cited by examiner

MOTOR AND ELECTRIC POWER STEERING DEVICE

CROSS REFERENCE TO RELATED APPLICATIONS

This is the U.S. national stage of PCT Application No. PCT/JP2017/046166, filed on Dec. 22, 2017, and priority under 35 U.S.C. § 119(a) and 35 U.S.C. § 365(b) is claimed from Japanese Application No. 2016-254993, filed Dec. 28, 2016; the entire disclosures of which are incorporated herein by reference.

1. FIELD OF THE INVENTION

The present disclosure relates to a motor and an electric power steering device.

2. BACKGROUND

There is known a cooling structure in which, in order to dissipate heat generated from an electronic component, a substrate on which the electronic component is mounted and a heat sink are assembled and a heat dissipating material is used between the electronic component and the heat sink. In the related art, the heat dissipating material is applied on the substrate or the heat sink, and then the substrate and the heat sink are assembled to spread the heat dissipating material between the two members.

In a case in which the above-described cooling structure is adopted in a motor including a substrate, a bearing holder may be used as a heat sink. A through-hole through which a rotating shaft is passed is formed in the bearing holder in some cases. In this case, there is a concern that a heat dissipating material may be attached to a rotating portion through the through-hole and inhibit the rotation.

SUMMARY

According to an example embodiment of the present disclosure, a motor includes a shaft that rotates about a central axis extending in a vertical direction, a heat sink made of metal in which a through-hole, through which the shaft extends, is defined, a substrate disposed at an upper side of the heat sink through a gap, a sensor magnet fixed to an upper end of the shaft, a rotation sensor located at an upper side of the sensor magnet, and a heat dissipating material located in a gap between the substrate and the heat sink. The heat sink includes a heat sink main body portion and a wall portion located between the substrate and the heat sink main body portion and between the heat dissipating material and the through-hole when viewed from the vertical direction.

The above and other elements, features, steps, characteristics and advantages of the present disclosure will become more apparent from the following detailed description of the example embodiments with reference to the attached drawings.

DETAILED DESCRIPTION

Hereinafter, motors according to example embodiments of the present disclosure will be described with reference to the accompanying drawings. Further, the scope of the present disclosure is not limited to the example embodiments below and may be arbitrarily changed within the scope of the technical idea of the present disclosure. Also, in the following drawings, the scale, the number, or the like of each structure may be different from the actual structure in some cases in order to facilitate understanding of each configuration.

Also, in the drawings, an XYZ coordinate system is shown as a three-dimensional orthogonal coordinate system as appropriate. In the XYZ coordinate system, the Z-axis direction is a direction parallel to an axial direction of a central axis J shown in FIG. 1. The X-axis direction is a direction orthogonal to the Z-axis direction and is a left-right direction in FIG. 1. The Y-axis direction is a direction orthogonal to both the X-axis direction and the Z-axis direction.

Also, in the following description, a positive side in the Z-axis direction (+Z side, one side) will be referred to as "upper side," and a negative side in the Z-axis direction (−Z side, the other side) will be referred to as "lower side." Further, "upper side" and "lower side" are names simply used for description purposes and do not limit the actual positional relationship or direction. Also, unless otherwise noted, the direction parallel to the central axis J (Z-axis direction) will be simply referred to as "axial direction," a radial direction about the central axis J will be simply referred to as "radial direction," and a circumferential direction about the central axis J, i.e., a direction around the axis of the central axis J, will be simply referred to as "circumferential direction."

Figure 1:
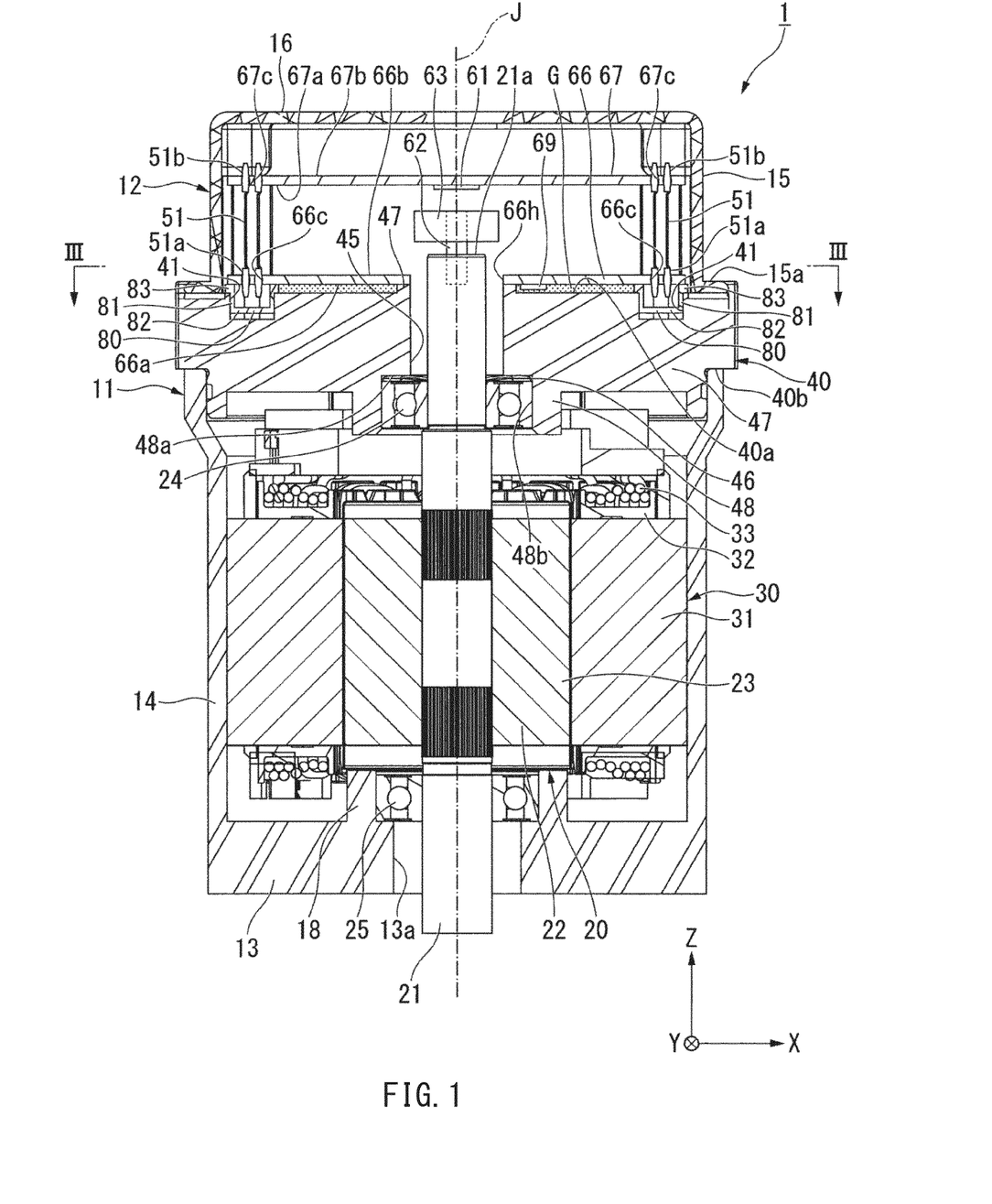
FIG. 1 is a cross-sectional view illustrating a motor according to an example embodiment of the present disclosure.
Figure 2:
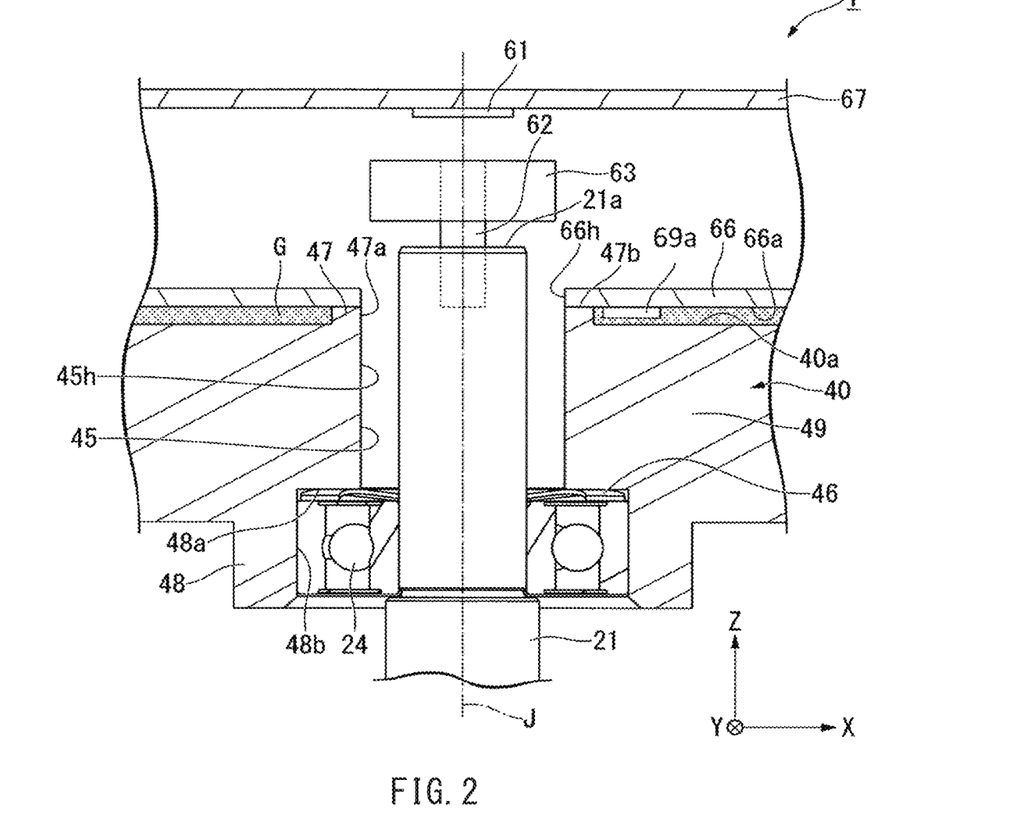
FIG. 2 is an enlarged partial cross-sectional view of FIG. 1.

FIG. 1 is a cross-sectional view illustrating a motor 1 according to the present example embodiment. FIG. 2 is an enlarged partial cross-sectional view of FIG. 1. The motor 1 includes a motor housing 11, a substrate housing 12, a rotor 20 having a shaft 21, a stator 30, an upper bearing (bearing) 24, a lower bearing 25, a sensor magnet 63, a bearing holder (heat sink) 40, a first substrate 66, a second substrate 67, a rotation sensor 61, and a heat dissipating material G.

The motor housing 11 and the substrate housing 12 accommodate each part of the motor 1 therein. The motor housing 11 is in the form of a tube that opens to the upper side (+Z side). Also, the substrate housing 12 is in the form of a tube that opens to the lower side (−Z side). The motor housing 11 and the substrate housing 12 are disposed such that the openings thereof face each other. A circumferential portion of the bearing holder 40, which will be described below, is sandwiched between the motor housing 11 and the substrate housing 12.

The motor housing 11 has a first tubular portion 14, a first bottom portion 13, and a lower bearing holding portion 18. The first tubular portion 14 is in the form of a tube that surrounds a radially outer side of the stator 30. In the present example embodiment, the first tubular portion 14 has, for example, a cylindrical shape. An upper end of the first tubular portion 14 is fitted into a stepped portion 40b formed at a circumferential edge of the bearing holder 40. The stator 30 is fixed to an inner surface of the first tubular portion 14.

The first bottom portion 13 is provided at an end at the lower side (−Z side) of the first tubular portion 14. An output shaft hole portion 13a passing through the first bottom portion 13 in the axial direction (Z-axis direction) is formed in the first bottom portion 13. The lower bearing holding portion 18 is provided at a surface at the upper side (+Z side) of the first bottom portion 13. The lower bearing holding portion 18 holds the lower bearing 25.

The substrate housing 12 is located at the upper side (+Z side) of the motor housing 11. In the present example embodiment, the substrate housing 12 accommodates the first substrate 66 and the second substrate 67. An electronic component or the like is mounted on at least one of upper surfaces and lower surfaces of the first substrate 66 and the second substrate 67. The substrate housing 12 has a second tubular portion 15 and a second bottom portion 16. Further, the number of substrates used in the motor 1 is not limited to two and may also be one or three or more.

The second tubular portion 15 is in the form of a tube that surrounds radially outer sides of the first substrate 66 and the second substrate 67. The second tubular portion 15 has, for example, a cylindrical shape. A flange portion 15a is formed at a lower end of the second tubular portion 15. The second tubular portion 15 is connected to an upper surface 40a of the bearing holder 40 at the flange portion 15a.

The rotor 20 has the shaft 21, a rotor core 22, a rotor magnet 23, and the sensor magnet 63. The shaft 21 is around the central axis J extending in the vertical direction (Z-axis direction). The shaft 21 is rotatably supported around an axis of the central axis J by the lower bearing 25 and the upper bearing 24. An end at the lower side (−Z side) of the shaft 21 protrudes to the outside of a housing 10 through the output shaft hole portion 13a. For example, a coupler (not illustrated) for connecting to an output target is press-fitted into the end at the lower side of the shaft 21. An end at the upper side (+Z side) of the shaft 21 protrudes to the upper side of the first substrate 66 through a through-hole 45 in the bearing holder 40 and a substrate through-hole 66h in the first substrate 66. A hole portion is formed in an upper end surface 21a of the shaft 21. An attaching member 62 is fitted into the hole portion of the shaft 21. The attaching member 62 is a bar-shaped member extending in the axial direction. The sensor magnet 63 is fixed to a distal end of the attaching member 62.

The rotor core 22 is fixed to the shaft 21. The rotor core 22 surrounds the shaft 21 in the circumferential direction. The rotor magnet 23 is fixed to the rotor core 22. More specifically, the rotor magnet 23 is fixed to an outer side of the rotor core 22 in the circumferential direction. The rotor core 22 and the rotor magnet 23 rotate together with the shaft 21. Further, the rotor core 22 may have a through-hole or a concave portion, and the rotor magnet 23 may be accommodated in the through-hole or the concave portion.

The sensor magnet 63 is fixed to an upper end of the shaft 21. The sensor magnet 63 has a circular ring shape. The sensor magnet 63 is fitted to an outer surface of the attaching member 62 fixed to the shaft 21. Further, the shape of the sensor magnet 63 is not limited to the circular ring shape, and may be another shape such as an annular shape or a disk shape. In this case, a concave portion may be formed in the sensor magnet 63, and the distal end of the attaching member 62 may be fixed to the concave portion by press-fitting, adhesion, or the like. Also, the sensor magnet 63 may be directly attached to a distal end of the shaft 21.

The stator 30 surrounds a radially outer side of the rotor 20. The stator 30 has a stator core 31, a bobbin 32, and a coil 33. The bobbin 32 is configured with a material having an insulation property. The bobbin 32 covers at least a portion of the stator core 31. Upon driving of the motor 1, the coil 33 magnetizes the stator core 31. The coil 33 is configured by winding a conductive wire. The coil 33 is provided around the bobbin 32. A connection terminal (not illustrated) is provided at an end of the conductive wire constituting the coil 33. The connection terminal extends upward from the coil 33. The connection terminal is connected to the first substrate 66 by passing through the bearing holder 40. Further, the end of the conductive wire constituting the coil 33 may be directly connected to the first substrate 66.

In the present example embodiment, the upper bearing 24 and the lower bearing 25 are ball bearings. The upper bearing 24 rotatably supports the upper end of the shaft 21. The upper bearing 24 is located at the upper side (+Z side) of the stator 30. The upper bearing 24 is held by the bearing holder 40. The lower bearing 25 rotatably supports the lower end of the shaft 21. The lower bearing 25 is located at the lower side (−Z side) of the stator 30. The lower bearing 25 is held by the lower bearing holding portion 18 of the motor housing 11.

The upper bearing 24 and the lower bearing 25 support the shaft 21. The type of the upper bearing 24 and the lower bearing 25 is not particularly limited, and other types of bearings may also be used.

The first substrate 66 and the second substrate 67 control the motor 1. That is, the motor 1 is configured of the first substrate 66 and the second substrate 67 and includes a control device 60 configured to control rotation of the shaft 21. Electronic components are mounted on the first substrate 66 and the second substrate 67. The electronic components mounted on the first substrate 66 and the second substrate 67 include the rotation sensor 61, an electrolytic capacitor, a choke coil, and the like.

The first substrate 66 is disposed at the upper side (+Z side) of the bearing holder 40. The second substrate 67 is disposed at the upper side of the first substrate 66. A plate surface direction of both the first substrate 66 and the second substrate 67 is perpendicular to the axial direction. The first substrate 66 and the second substrate 67 are disposed so as to overlap each other when viewed from the axial direction. That is, the first substrate 66 and the second substrate 67 are stacked in the axial direction with a predetermined gap therebetween.

The first substrate 66 has a lower surface 66a and an upper surface 66b. Likewise, the second surface 67 has a lower surface 67a and an upper surface 67b. The upper surface 66b of the first substrate 66 and the lower surface 67a of the second substrate 67 face each other in the vertical direction through a gap. Also, the lower surface 66a of the first substrate 66 and the upper surface 40a of the bearing holder 40 face each other in the vertical direction through a gap. That is, the first substrate 66 is disposed at the upper side of the bearing holder 40 through a gap. The gap between the first substrate 66 and the bearing holder 40 is filled with the heat dissipating material G.

A plurality of holes 66c and 67c respectively passing through the first substrate 66 and the second substrate 67 in the vertical direction are formed in the first substrate 66 and the second substrate 67. The hole 66c of the first substrate 66 and the hole 67c of second substrate 67 are disposed to overlap each other when viewed from the axial direction. A connection pin 51 extends in the axial direction (vertical direction) between the holes 66c and 67c. The connection pin 51 has a first distal end 51a located at the lower side and a second distal end 51b located at the upper side. The first distal end 51a is press-fitted into the hole 66c of the first substrate 66 from the upper surface 66b. Also, the second distal end 51b is press-fitted into the hole 67c of the second substrate 67 from the lower surface 67a. Consequently, the first substrate 66 and the second substrate 67 are electrically connected by a plurality of connection pins (wiring).

The substrate through-hole 66h is formed in the first substrate 66. The shaft 21 is passed through the substrate through-hole 66h. Accordingly, the upper end surface 21a of the shaft 21 is located above the upper surface 66b of the first substrate 66. Also, the sensor magnet 63 fixed to the upper end of the shaft 21 is located above the first substrate 66.

Figure 3:
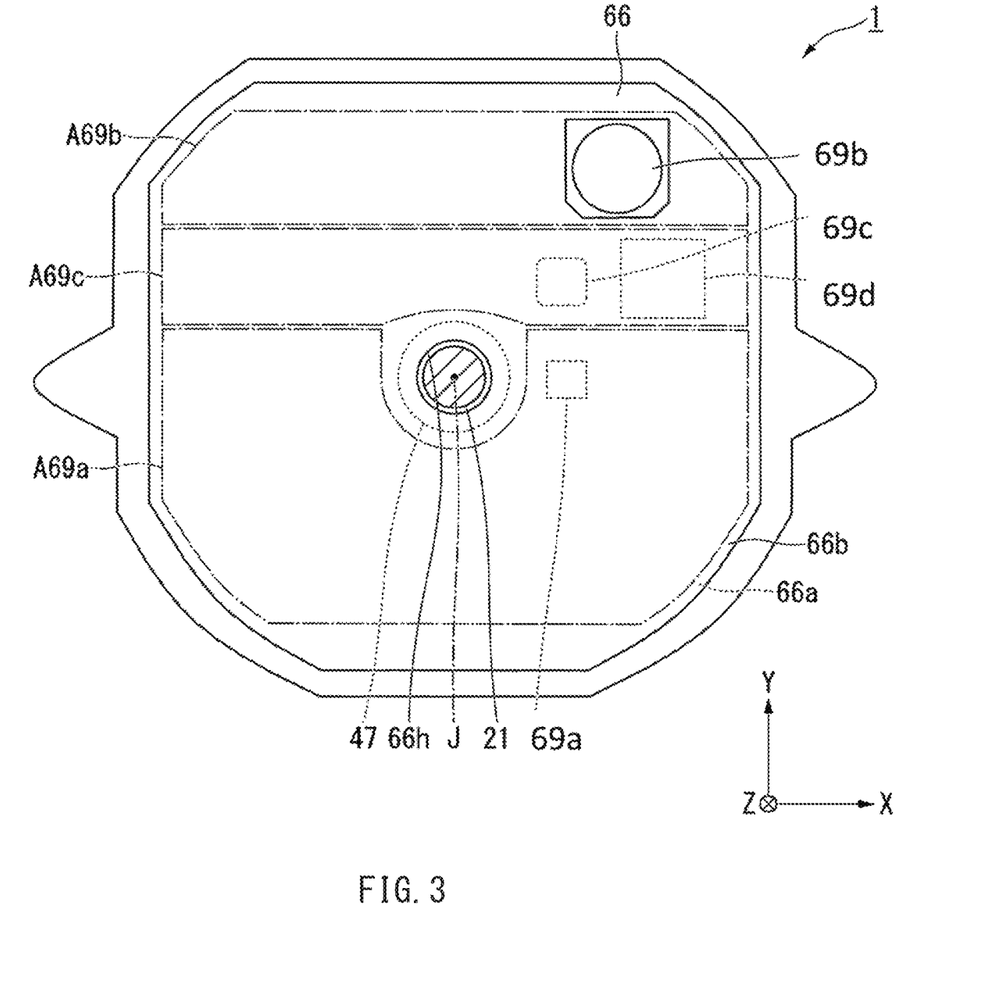
FIG. 3 is a top view of a first substrate in the motor according to an example embodiment of the present disclosure.

Heating elements 69 are mounted on the lower surface 66a of the first substrate 66. FIG. 3 is a top view of the first substrate 66. As the heating elements 69, a field-effect transistor 69a, a field-effect transistor driver integrated circuit 69c, and a power supply integrated circuit 69d are mounted on the lower surface 66a of the first substrate 66, and, as the heating element 69, a capacitor 69b is mounted on the upper surface 66b. That is, some of the plurality of heating elements 69 are located on the lower surface 66a of the first substrate 66. Also, the heating elements 69 are located radially outward from a wall portion 47 of the bearing holder 40 when viewed from the vertical direction. Since the heating elements 69 are between the lower surface 66a and the upper surface 40a of the bearing holder 40, and a radially outer side of the wall portion 47 is filled with the heat dissipating material G, the heating elements 69 are covered by the heat dissipating material G. Because of this, according to the present example embodiment, heat can be efficiently transferred from the heating elements 69 to the heat dissipating material G.

Further, although, among the plurality of heating elements 69, all the heating elements 69 except for the capacitor 69b are disposed on the upper surface 66b of the first substrate 66, all the heating elements 69 may also be disposed on the lower surface 66a of the first substrate 66. That is, among the plurality of heating elements 69, the above-described effect can be achieved as long as any one or two or more of the field-effect transistor 69a, the capacitor 69b, the field-effect transistor driver integrated circuit 69c, and the power supply integrated circuit 69d among the plurality of heating elements 69 are mounted on the lower surface 66a of the first substrate 66.

In the present specification, the heating elements 69 refer to elements that generate heat and reach a high temperature during operation among the mounted components. Although a field-effect transistor, a capacitor, a field-effect transistor driver integrated circuit, a power supply integrated circuit, a switching element, and a semiconductor switching elements are examples of the heating elements 69 as described above, the type of heating elements 69 is not limited, and any element capable of reaching a high temperature may be used.

As illustrated in FIG. 3, the lower surface 66a of the first substrate 66 is divided into three areas (a first area A69a, a second area A69b, and a third area A69c). The first area A69a, the third area A69c, the second area A69b are arranged in this order in one direction (the Y-axis direction in the present example embodiment) within the surface. That is, in the Y-axis direction, the third area A69c is located between the first area A69a and the second area A69b. Boundary lines of the first to third areas A69a, A69b, and A69c extend nearly in parallel with each other. The first area A69a occupies half or more of the entire lower surface 66a. It is desirable that the field-effect transistor 69a be located in the first area A69a. It is desirable that the capacitor 69b be located in the second area A69b. It is desirable that the field-effect transistor driver integrated circuit 69c and the power supply integrated circuit 69d be located in the third area A69c.

The rotation sensor 61 is mounted on the lower surface 67a of the second substrate 67. The rotation sensor 61 is located at an upper side of the sensor magnet 63. The rotation sensor 61 is disposed to overlap the sensor magnet 63 when viewed from the axial direction. The rotation sensor 61 detects rotation of the sensor magnet 63. In the present example embodiment, the rotation sensor 61 is a magnetic resistance element. The rotation sensor 61 may be, for example, a Hall element.

The heat dissipating material G is located between the upper surface 40a of the bearing holder 40 and the lower surface 66a of the first substrate 66. The heat dissipating material G transfers heat generated from the first substrate 66 and the components mounted on the first substrate 66 to the bearing holder 40. The bearing holder 40 dissipates the heat transferred from the heat dissipating material G to the outside. The heat dissipating material G may be in a semi-solid phase (or gel phase) having flexibility that allows the shape of the heat dissipating material G to be easily changed due to a pressure applied in one direction. The heat dissipating material G may be grease having fluidity. Also, the heat dissipating material G may be a curable material that has fluidity in an uncured state and cures after application.

In the present example embodiment, the heat dissipating material G has an insulating property. Consequently, the heat dissipating material can suppress discharge between the first substrate 66 and the bearing holder 40. Further, in a case in which the heat dissipating material G does not have an insulating property, insulating measures such as attaching an insulating sheet to the upper surface 40a of the bearing holder 40 may be taken.

The bearing holder 40 is located at the upper side (+Z side) of the stator 30. The bearing holder 40 includes a holder main body portion (heat sink main body portion) 49, an upper bearing holding portion 48, and the wall portion 47. Also, a through-hole 45 through which the shaft 21 is passed is formed in the bearing holder 40. The bearing holder 40 directly holds the upper bearing 24 in the upper bearing holding portion 48. The shape of the bearing holder 40 in plan view (XY view) may be, for example, a circular shape concentric with the central axis J. The bearing holder 40 is made of metal. In the present example embodiment, the bearing holder 40 is sandwiched between the motor housing 11 and the substrate housing 12. Further, the shape of the bearing holder 40 in plan view (XY view) is not limited to the circular shape and may be another shape such as a polygonal shape.

The bearing holder 40 receives heat generated from the first substrate 66 and the components mounted on the first substrate 66 via the heat dissipating material G and dissipates the received heat to the outside. That is, according to the present example embodiment, the bearing holder 40 may serve as a heat sink. It is desirable that the bearing holder 40 be made of a material having high heat conduction efficiency, e.g., aluminum alloys. Further, the bearing holder 40 may also be made of a material such as aluminum, copper, copper alloys or iron-based metal such as stainless use steel (SUS).

The upper bearing holding portion 48 is provided at a surface at the lower side (−Z side) of the bearing holder 40. The upper bearing holding portion 48 holds the upper bearing 24. The upper bearing holding portion 48 has a downward surface 48*a* facing downward and a holding portion inner circumferential surface 48*b* facing a radially inner side. The through-hole 45 is open in the downward surface 48*a*. The downward surface 48*a* comes into contact with an upper surface of an outer ring of the upper bearing 24 via a wave washer 46. Also, the holding portion inner circumferential surface 48*b* is fitted to the outer ring of the upper bearing 24. The downward surface 48*a* locates the upper bearing 24 with respect to the bearing holder 40. By interposing the wave washer 46 between the downward surface 48*a* and the outer ring of the upper bearing 24, a pre-load can be applied to the upper bearing 24.

The through-hole 45 passing through the holder main body portion 49 in the vertical direction is formed in the holder main body portion 49. The through-hole 45 is located substantially at the center of the holder main body portion 49. The shaft 21 is passed through the through-hole 45. By the through-hole 45 being formed in the bearing holder 40, it is possible to improve a degree of freedom in a process of assembling the shaft 21 to the bearing holder 40. For example, upon the assembly, since a jig for receiving a force upon press-fitting into the upper end surface 21*a* of the shaft 21 can be disposed in the through-hole 45, an assembling order in which another member is press-fitted into the shaft 21 in a state in which the shaft 21 is assembled to the bearing holder 40 may be adopted.

The holder main body portion 49 has the upper surface 40*a* facing upward. The upper surface 40*a* faces the lower surface 66*a* of the first substrate 66. An accommodating concave portion 41 that is concave downward is formed in the upper surface 40*a*. The accommodating concave portion 41 is open upward. A spacer 80 is inserted into the accommodating concave portion 41.

The spacer 80 has a side wall portion 81 disposed along an inner surface of the accommodating concave portion 41, a bottom wall portion 82 disposed along a bottom surface of the accommodating concave portion 41, and a flange portion 83 located at an upper end of the side wall portion 81. The spacer 80 is made of an insulating material. The flange portion 83 is screwed to the flange portion 83 together with the first substrate 66 in a state of being sandwiched between the bearing holder 40 and the first substrate 66. The flange portion 83 determines a vertical location of the first substrate 66 with respect to the bearing holder 40.

The wall portion 47 protrudes upward from the upper surface 40*a* of the holder main body portion 49. The wall portion 47 extends in a circular shape with the central axis J as the center when viewed from the vertical direction. The wall portion 47 is located between the holder main body portion 49 and the first substrate 66. The wall portion 47 is located at a lower side of the first substrate 66. An upper end surface 47*b* of the wall portion 47 and the lower surface 66*a* of the first substrate 66 are in contact. The wall portion 47 has an inner surface 47*a*, which is a radially inward surface. The inner surface 47*a* faces an outer circumferential surface of the shaft 21. That is, the wall portion 47 surrounds the shaft 21 from the radially outer side thereof. The inner surface 47*a* is continuously connected, without a stepped portion, to an inner circumferential surface 45*h* of the through-hole 45 of the holder main body portion 49. Also, the inner surface 47*a* and an inner circumferential surface of the substrate through-hole 66*h* of the first substrate 66 substantially correspond to each other when viewed from the vertical direction.

The wall portion 47 divides a space between the heat dissipating material G and the through-hole 45 in order to suppress the heat dissipating material G from reaching the through-hole 45. In the present example embodiment, a portion between the first substrate 66 and the bearing holder 40 is filled with the heat dissipating material G in the circumferential direction of the shaft 21. In the present example embodiment, the wall portion 47 surrounds the shaft 21 from the radially outer side thereof so that the heat dissipating material G is suppressed from moving radially inward. However, in a case in which the heat dissipating material G is located only in a partial area of the shaft 21 in the circumferential direction, the above-described effect can be achieved even when the wall portion 47 does not surround the shaft 21, as long as the wall portion 47 is located between the heat dissipating material G and the through-hole 45 when viewed in the vertical direction.

In the present example embodiment, the wall portion 47 is in contact with the lower surface 66*a* of the first substrate 66 at the upper end surface 47*b*. Consequently, the effect of suppressing infiltration of the heat dissipating material G into the through-hole 45 can be improved. On the lower surface 66*a* of the first substrate 66, a circuit pattern is not formed in an area in contact with the wall portion 47, and insulation between the first substrate 66 and the bearing holder 40 is secured. Further, a fixed effect can be achieved even when the wall portion 47 is not in contact with the first substrate 66 as long as the wall portion 47 narrows a vertical gap in a path along which the heat dissipating material G moves radially inward.

The entire wall portion 47 according to the present example embodiment is located at a lower side of the first substrate 66. However, a portion of the wall portion 47 may be located at the lower side of the first substrate 66, and the other portion of the wall portion 47 may be located radially inward of the substrate through-hole 66*h* of the first substrate 66 when viewed from the vertical direction. Even in that case, the above-described effect can be achieved.

According to the present example embodiment, the inner surface 47*a* of the wall portion 47 is located on an extension surface of the inner circumferential surface 45*h* of the through-hole 45. Because of this, in the lower surface 66*a* of the first substrate 66, an area located radially outward from the wall portion 47 may be widened while securing a size of the through-hole 45. In other words, it becomes possible to secure an area in which the heat dissipating material G may be disposed to be wide. As a result, an area in which the heat dissipating material G is disposed may be widened in plan view. Consequently, efficiency of heat transfer from the first substrate 66 to the bearing holder 40 can be improved, and heat generated from the first substrate 66 can be more efficiently dissipated through the bearing holder 40. Further, in the present example embodiment, the case in which the entire inner surface 47*a* of the wall portion 47 is located on an extension line of the inner circumferential surface 45*h* of the through-hole 45 has been described as an example. However, as long as at least a portion of the inner surface 47*a* of the wall portion 47 is located on the extension line of the inner circumferential surface 45h, the above-described effect can be achieved at least in that portion.

Figure 4:
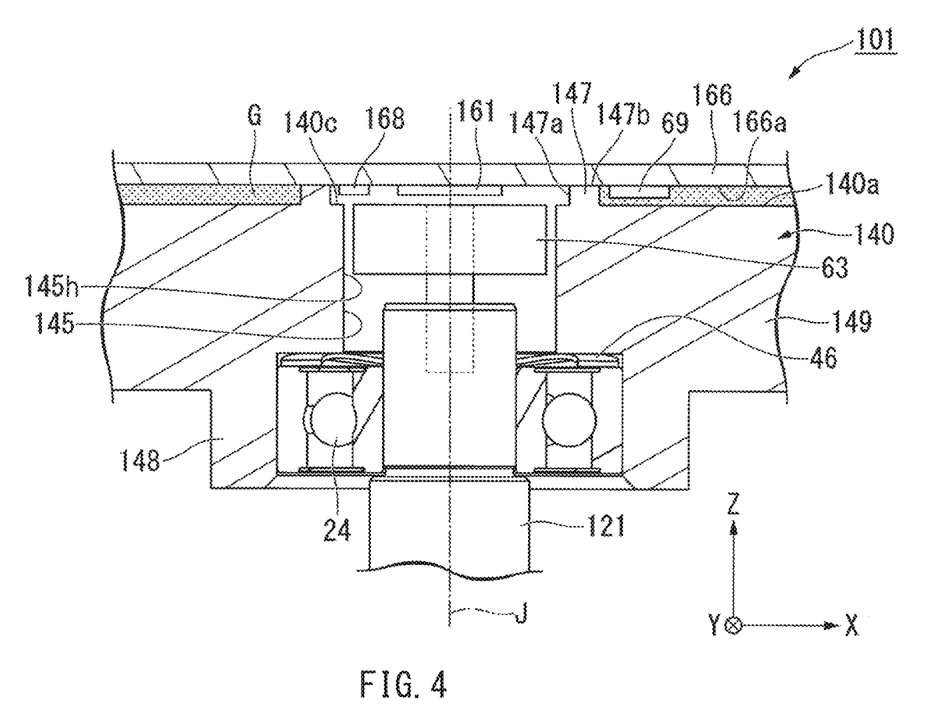
FIG. 4 is a partial cross-sectional view of a motor according to a first modified example embodiment of the present disclosure.

FIG. 4 is a partial cross-sectional view of a motor 101 according to a first modified example. In the motor 101 according to the present modified example, a structure of a bearing holder (heat sink) 140, locations of a sensor magnet 63 and rotation sensors 161 and 168 fixed to an upper end of a shaft 121, and the like are different as compared with the above-described motor 1. Further, the same reference numerals will be given to elements having the same aspects as those of the above-described example embodiment, and the description thereof will be omitted.

The motor 101 according to the present modified example includes the shaft 121, the sensor magnet 63, the bearing holder (heat sink) 140, a first substrate 166, a first rotation sensor 161, a second rotation sensor 168, and a heat dissipating material G.

The bearing holder 140 includes a holder main body portion (heat sink main body portion) 149, an upper bearing holding portion 148, and a wall portion 147. A through-hole 145 passing through the holder main body portion 149 in the vertical direction is formed in the holder main body portion 149. An upper end of the shaft 121 and the sensor magnet 63 are disposed in the through-hole 145. The upper bearing holding portion 148 holds an upper bearing 24.

The wall portion 147 divides a space between the heat dissipating material G and the through-hole 145 to suppress the heat dissipating material G from reaching the through-hole 145. The wall portion 147 protrudes upward from an upper surface 140a of the holder main body portion 149. The wall portion 147 is located between the holder main body portion 149 and the first substrate 166. The wall portion 147 is located at the lower side of the first substrate 166. An upper end 147b of the wall portion 147 and a lower surface 166a of the first substrate 166 are in contact. The wall portion 147 surrounds the shaft 121 from the radially outer side thereof.

An inner surface 147a, which is a surface of the wall portion 147 toward the shaft 121, is located radially outward from an inner circumferential surface 145h of the through-hole 145. A stepped surface 140c facing upward is formed at an inner side of the wall portion 147. In the present modified example, although the stepped surface 140c of the bearing holder 140 and the upper surface 140a are located at the same height (on the same plane), heights at which the stepped surface 140c and the upper surface 140a are located may also be different from each other.

The first substrate 166 is disposed such that the lower surface 166a faces an upper side of the bearing holder 140. A substrate through-hole is not formed in the first substrate 166 according to the present modified example. Accordingly, the first substrate 166 covers an opening in an upper side of the through-hole 145 of the bearing holder 140.

The first rotation sensor 161 and the second rotation sensor 168 are mounted on the lower surface 166a of the first substrate 166. The second rotation sensor 168 is a rotation sensor provided preliminarily. The second rotation sensor 168 is used to complement angle detection by the first rotation sensor 161.

In the present modified example, the rotation sensors 161 and 168 are mounted on the first substrate 166, and all circuit configurations necessary for motor driving may be disposed on the first substrate 166. That is, in the present modified example, the motor 101 driven by a single substrate may be configured.

The first rotation sensor 161 and the second rotation sensor 168 are located at an upper side of the sensor magnet 63. The first rotation sensor 161 is located on the central axis J. The first rotation sensor 161 is disposed to overlap the sensor magnet 63 when viewed from the axial direction. Meanwhile, the second rotation sensor 168 is located radially outward from the first rotation sensor 161. Also, at least a portion of the second rotation sensor 168 overlaps the sensor magnet 63 when viewed from the axial direction. At least a portion of the second rotation sensor 168 faces the stepped surface 140c of the bearing holder 140.

According to the present modified example, the inner surface 147a of the wall portion 147 is located radially outward from the inner circumferential surface 145h of the through-hole 145. Because of this, a radially inner area of the wall portion 147 may be secured to be wide. Accordingly, even in a case in which the plurality of rotation sensors (the first rotation sensor 161 and the second rotation sensor 168) are mounted on the first substrate 166, a sufficient mounting area may be secured in the first substrate 166.

Further, although the entire inner surface 147a of the wall portion 147 is located radially outward from the inner circumferential surface 145h of the through-hole 145 in the present modified example, when at least a portion of the inner surface 147a is located radially outward from the inner circumferential surface 145h of the through-hole 145, the above-described effect can be achieved at least in that portion.

Figure 5:
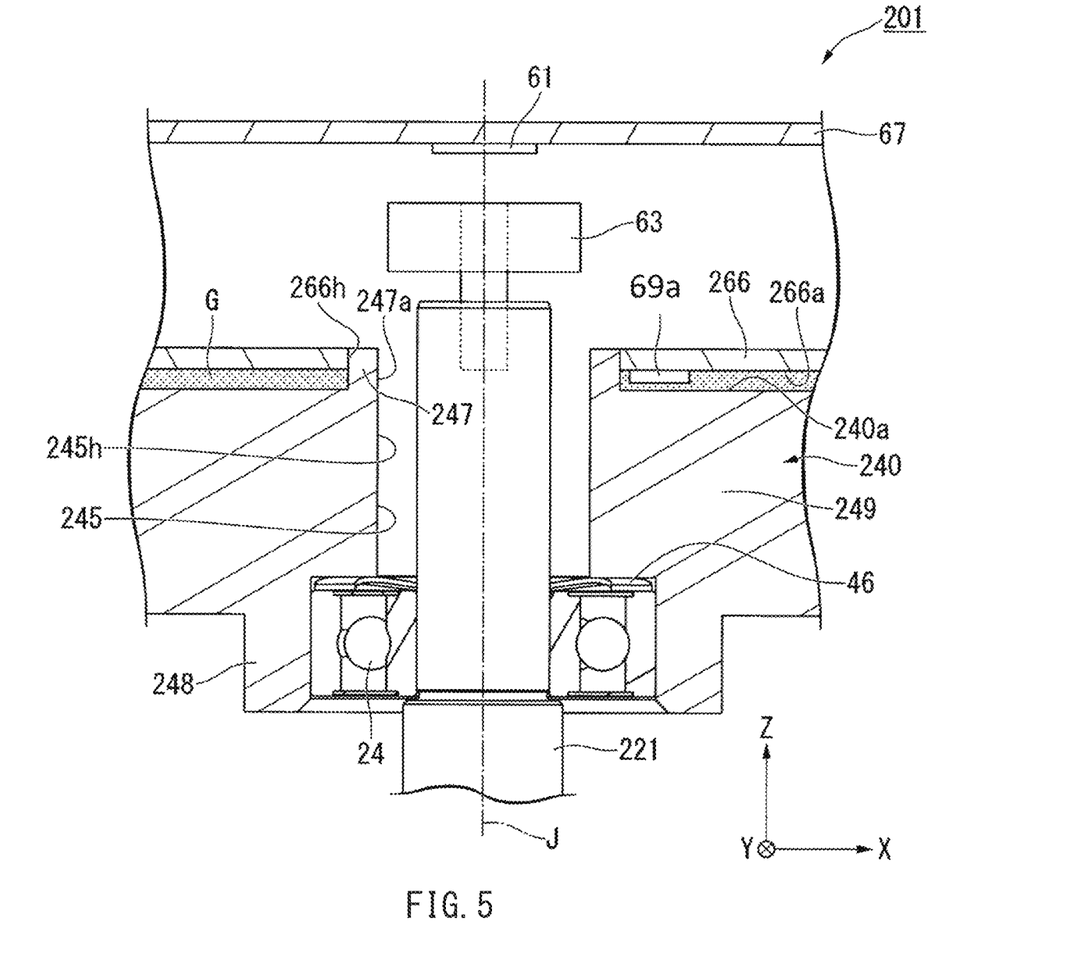
FIG. 5 is a partial cross-sectional view of a motor according to a second modified example embodiment of the present disclosure.

FIG. 5 is a partial cross-sectional view of a motor 201 according to a second modified example. In the motor 201 according to the present modified example, a configuration of a wall portion 247 is different as compared with the above-described motor 1. Further, the same reference numerals will be given to elements having the same aspects as those of the above-described example embodiment, and the description thereof will be omitted.

The motor 201 according to the present modified example includes a shaft 221, a sensor magnet 63, a bearing holder (heat sink) 240, a first substrate 266, a second substrate 67, a rotation sensor 61 mounted on the second substrate 67, and a heat dissipating material G.

The first substrate 266 is disposed such that a lower surface 266a faces an upper side of the bearing holder 240. A substrate through-hole 266h is formed in the first substrate 266. The shaft 221 is passed through the substrate through-hole 266h. Also, the sensor magnet 63 fixed to an upper end of the shaft 221 is located above the first substrate 266 and faces the rotation sensor 61 in the vertical direction.

The bearing holder 240 includes a holder main body portion (heat sink main body portion) 249, an upper bearing holding portion 248, and a wall portion 247. A through-hole 245 passing through the holder main body portion 249 in the vertical direction is formed in the holder main body portion 249. An upper end of the shaft 221 and the sensor magnet 63 are disposed in the through-hole 245. The upper bearing holding portion 248 holds an upper bearing 24.

The wall portion 247 divides a space between the heat dissipating material G and the through-hole 245 to suppress the heat dissipating material G from reaching the through-hole 245. The wall portion 247 protrudes upward from an upper surface 240a of the holder main body portion 249. The wall portion 247 surrounds the shaft 221 from the radially outer side thereof. The wall portion 247 has an inner surface 247a, which is a radially inward surface. The inner surface 247a faces an outer circumferential surface of the shaft 221. That is, the wall portion 247 surrounds the shaft 221 from the radially outer side thereof. The inner surface 247a is continuously connected, without a stepped portion, to an inner circumferential surface 245h of the through-hole 245 of the holder main body portion 249.

The wall portion 247 is located at an inner side of the substrate through-hole 266h. The wall portion 247 is located between an inner circumferential surface of the substrate through-hole 266h and the shaft 221. A radially outward surface of the wall portion 247 is in contact with the inner circumferential surface of the substrate through-hole 266h. Consequently, the effect of suppressing infiltration of the heat dissipating material G into the through-hole 245 can be improved. Further, a fixed effect can be achieved even when the wall portion 247 is not in contact with the first substrate 266. Also, according to the present modified example, since the wall portion 247 is located at the inner side of the substrate through-hole 266h, the first substrate 266 can be located by the wall portion 247.

In the present modified example, in all areas in the circumferential direction of the central axis J, the wall portion 247 is located between the inner circumferential surface of the substrate through-hole 266h and the shaft 221. However, as long as the wall portion 247 is located on at least a portion of the areas in the circumferential direction, the above-described effect can be achieved at least in that portion.

The following configurations may be adopted in the above-described example embodiments.

The case in which the heat sink is the bearing holder 40 configured to directly hold the upper bearing 24 has been described as an example in the above example embodiment and modified examples thereof. However, the heat sink (corresponding to the bearing holder 40 according to the above-described example embodiment) may hold the upper bearing 24 indirectly via a separately-prepared bearing holder. In this case, it is desirable that the heat sink be fixed to the bearing holder.

In the above example embodiment and modified examples thereof, the holder main body portion 49 and the wall portion 47 are a single member. However, the wall portion may also be a separate member from the holder main body portion. In this case, the wall portion is fixed to the holder main body portion using a known method such as adhesion. Also, the wall portion may be fixed to the first substrate and be spaced apart from the holder main body portion.

Figure 6:
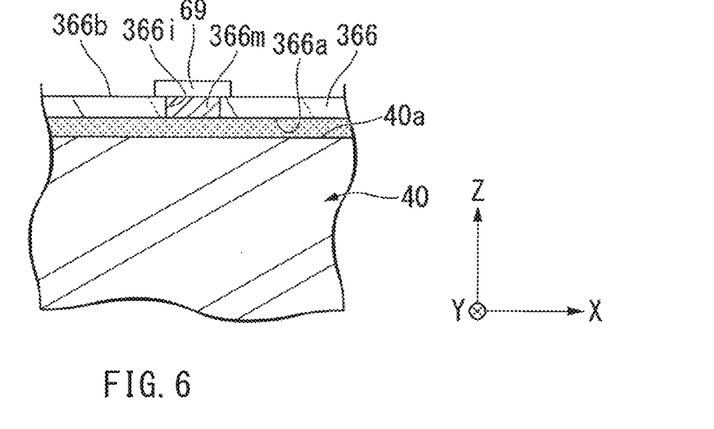
FIG. 6 is a partial cross-sectional view of a copper inlay substrate that can be adopted in the motor according to an example embodiment of the present disclosure.

Also, in the above example embodiment, a copper inlay substrate 366 may be adopted in place of the first substrate 66. FIG. 6 illustrates the copper inlay substrate 366 that may be adopted to the above example embodiment. A through-hole 366i extending in a thickness direction of the copper inlay substrate 366 is formed in the copper inlay substrate 366. A heat transfer member 366m is inserted into the through-hole 366i. The heat transfer member 366m is made of copper alloys. That is, the copper inlay substrate 366 has the heat transfer member 366m made of copper that passes through the copper inlay substrate 366 in the thickness direction thereof. The heating elements 69 are mounted on the copper inlay substrate 366. The heating elements 69 come into contact with the heat transfer member on an upper surface 366b of the copper inlay substrate 366. The bearing holder 40 is disposed at a lower side of a first circuit board through the heat dissipating material G. The heat generated from the heating elements 69 is transferred toward a lower surface 366a of the copper inlay substrate 366 through the heat transfer member 366m. Moreover, the heat is dissipated to the bearing holder 40 through the heat dissipating material G. By using the copper inlay substrate 366 as the first circuit board, even in a case in which the heating elements 69 are mounted on a surface (the upper surface 366b) that is opposite to the heat dissipating material G, the heat from the heating elements 69 can be efficiently transferred to the heat dissipating material G.

Figure 7:
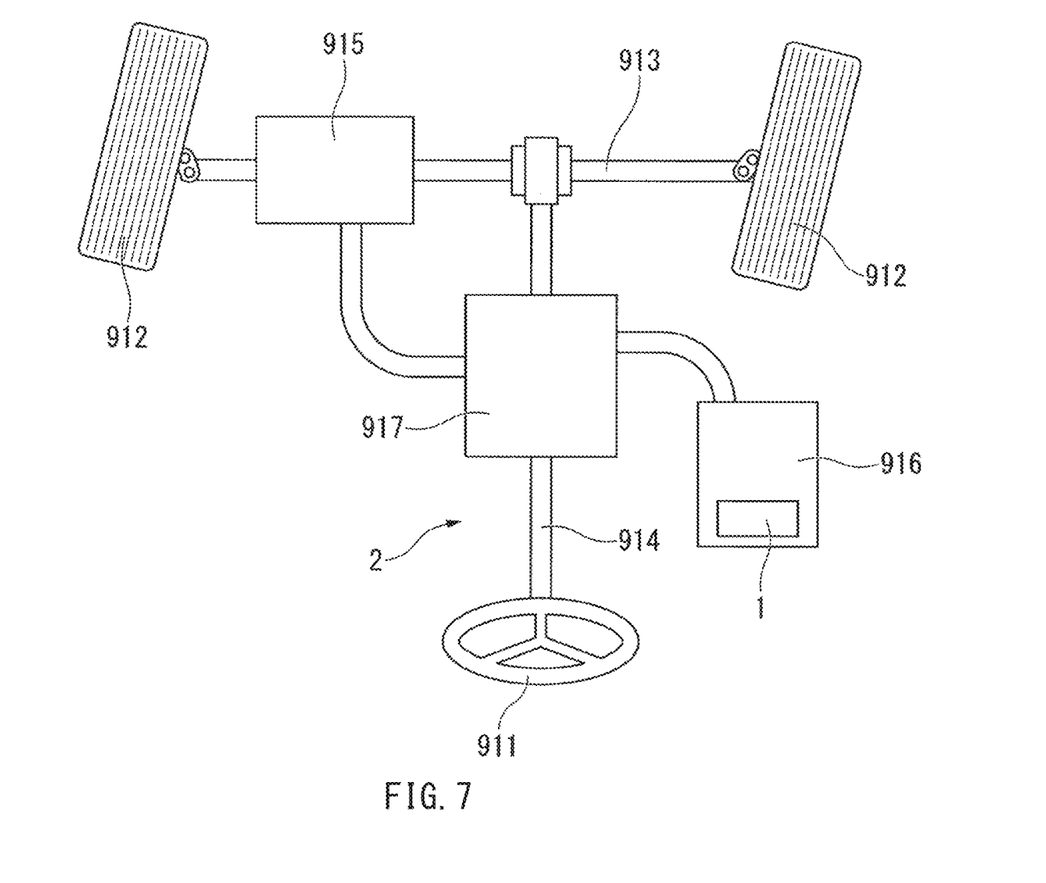
FIG. 7 is a schematic diagram illustrating an electric power steering device according to an example embodiment of the present disclosure.

Next, an example embodiment of a device on which the motor 1 according to the present example embodiment is mounted will be described. In the present example embodiment, an example in which the motor 1 is mounted on an electric power steering device will be described. FIG. 7 is a schematic diagram illustrating an electric power steering device 2 according to the present example embodiment.

The electric power steering device 2 is mounted on a vehicle wheel steering mechanism of an automobile. The electric power steering device 2 is a device that reduces a steering force using an oil pressure. As illustrated in FIG. 7, the electric power steering device 2 according to the present example embodiment includes the motor 1, a steering shaft 914, an oil pump 916, and a control valve 917.

The steering shaft 914 transmits an input from a steering wheel 911 to an axle 913 having a vehicle wheel 912. The oil pump 916 generates an oil pressure in a power cylinder 915 configured to transfer a driving force due to the oil pressure to the axle 913. The control valve 917 controls oil of the oil pump 916. In the electric power steering device 2, the motor 1 is mounted as a driving source of the oil pump 916.

Since the electric power steering device 2 according to the present example embodiment includes the motor 1 according to the present example embodiment, heat generated from the first substrate 66 can be dissipated efficiently. Consequently, according to the present example embodiment, the electric power steering device 2 with excellent reliability is obtained.

Although the example embodiment and modified examples thereof of the present disclosure have been described above, each configuration, combinations thereof, and the like in the example embodiment are merely examples, and elements may be added, omitted, substituted, or changed in other ways within the scope not departing from the gist of the present disclosure. Also, there is no case in which the present disclosure is limited by the example embodiment.

According to one aspect of the present disclosure, a motor capable of efficiently dissipating heat generated from a substrate and an electric power steering device including such a motor are provided.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
a shaft to rotate about a central axis extending in a vertical direction;
a metal heat sink including a through-hole through which the shaft extends;
a substrate disposed at an upper side of the heat sink through a gap;
a sensor magnet fixed to an upper end of the shaft;
a rotation sensor located at an upper side of the sensor magnet; and
a heat dissipating material located in the gap between the substrate and the heat sink; wherein
the heat sink includes a heat sink main body portion and a wall portion located between the substrate and the heat sink main body portion and between the heat dissipating material and the through-hole when viewed from the vertical direction;

the gap is located between an outer surface of the wall portion, a lower surface of the substrate, an upper surface of the heat sink, and a radially opposing surface opposing the outer surface of the wall portion in a radial direction;

the heat dissipating material completely fills and closes the gap;

the wall portion is integrally provided together with the heat sink main body portion and protrudes upward from an upper surface of the heat sink main body portion; and the substrate contacts the wall portion via a structure having an electrically insulating property, or the substrate is in contact with the wall portion at an area which does not include any circuit pattern.

2. The motor according to claim 1, wherein the wall portion surrounds the shaft from a radially outer side thereof.

3. The motor according to claim 1, wherein at least a portion of the wall portion is located at a lower side of the substrate.

4. The motor according to claim 3, wherein at least a portion of a surface of the wall portion toward the shaft is located on an extension surface of an inner circumferential surface of the through-hole.

5. The motor according to claim 3, wherein at least a portion of a surface of the wall portion toward the shaft is located radially outward from the inner circumferential surface of the through-hole.

6. The motor according to claim 1, wherein
a substrate through-hole, through which the shaft extends, is provided in the substrate; and
at least a portion of the wall portion is located in the substrate through-hole.

7. The motor according to claim 1, wherein
a heating element is mounted on the substrate; and
the heating element is located radially outward from the wall portion.

8. The motor according to claim 7, wherein the heating element is located at the lower surface of the substrate.

9. The motor according to claim 7, wherein
the substrate includes a heat transfer member made of metal that passes through the substrate in a thickness direction thereof; and
the heating element comes into contact with the heat transfer member at an upper surface of the substrate.

10. The motor according to claim 7, wherein the heating element is any one of a field-effect transistor, a capacitor, a field-effect transistor driver integrated circuit, and a power supply integrated circuit.

11. An electric power steering device comprising the motor according to claim 1.

* * * * *